May 8, 1962 F. L. PUTZRATH 3,033,995

CIRCUIT FOR PRODUCING AN OUTPUT VOLTAGE INDICATIVE OF THE ABSOLUTE VALUE OF THE DIFFERENCE BETWEEN TWO INPUT VOLTAGES

Filed Aug. 31, 1960

INVENTOR.
FRANZ L. PUTZRATH
BY John V. Regan
ATTORNEY

United States Patent Office 3,033,995
Patented May 8, 1962

3,033,995

CIRCUIT FOR PRODUCING AN OUTPUT VOLTAGE INDICATIVE OF THE ABSOLUTE VALUE OF THE DIFFERENCE BETWEEN TWO INPUT VOLTAGES

Franz Ludwig Putzrath, Oaklyn, N.J., assignor to Radio Corporation of America, a corporation of Delaware Filed Aug. 31, 1960, Ser. No. 53,212
6 Claims. (Cl. 307—88.5)

This application relates to a new and improved difference amplifier.

In some pattern matching equipments such as used in communication systems, reading machines, shape recognition machines, and the like, it is necessary to compare two input quantities such as voltages or currents and to derive therefrom an output signal which is proportional to the difference in these quantities. In certain of the above applications it is desirable to determine only the absolute magnitude of the difference in quantities regardless of which of the quantities is larger, and regardless of the absolute value of either of the quantities. Conventional difference amplifiers do not meet these requirements as they produce an output having a sense dependent upon which of the input quantities is the larger.

The circuit of the present invention solves the problem above in a simple, reliable and relatively inexpensive way. The circuit includes two parallel signal paths, each comprising two transistors of opposite conductivity connected in series. An operating voltage is applied to the transistors in both paths through a common load impedance. An input voltage having a magnitude equal to the difference between two input quantities is applied in one sense between the bases of the transistors in one path and in an opposite sense between the bases of the transistors in the other path. An output voltage which is proportional to the difference between the two input quantities appears at the common load impedance. The sign of the output voltage is independent of the sense of the difference between the input quantities or the absolute value of either of the input quantities.

The invention is discussed in greater detail below and is illustrated in the following drawings of which:

Figure 1:
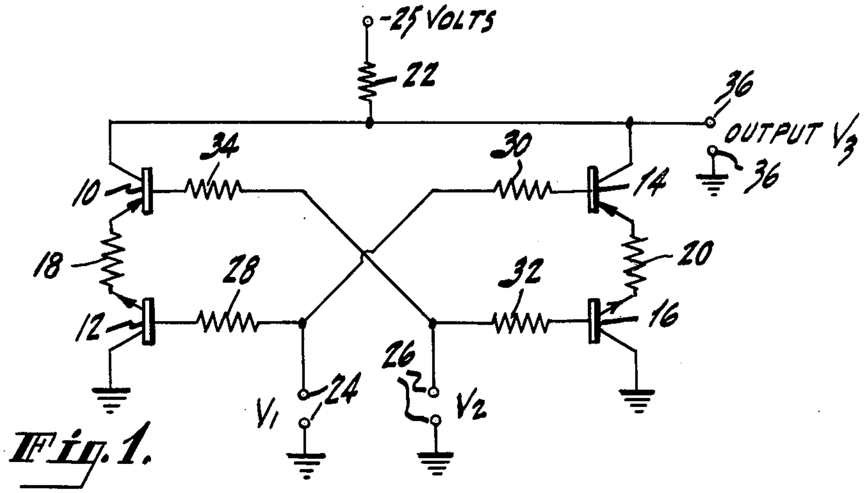
FIG. 1 is a schematic circuit diagram of the present invention.

The difference amplifier of FIG. 1 includes two parallel signal paths, the first including two transistors 10 and 12 of opposite conductivity type connected in series and the other including two transistors 14 and 16, also of opposite conductivity type, connected in series. Each of the signal paths includes, in addition to the transistors, resistors 18 and 20, respectively. An operating voltage, shown as −25 volts, is applied to the transistors through a common load impedance, such as a resistor 22.

The two input voltages $V_1$ and $V_2$ are concurrently applied between terminals 24 and 26, respectively. One of terminals 24 is connected through resistors 28 and 30 to the bases of the NPN transistor 12 in one path and the PNP transistor 14 in the other path, respectively. One of terminals 26 is similarly connected through resistors 32 and 34 to the bases of the NPN transistor 16 and PNP transistor 10, respectively. The other of the terminals 24 and 26 are connected to a point of reference potential, shown as ground.

The operation of the circuit of FIG. 1 may be better understood by assuming certain input voltages. Assume first that voltage $V_2$ is somewhat more negative than voltage $V_1$. For example, voltage $V_2$ may be −4 volts and voltage $V_1$, −2 volts. Under these conditions, the sense of the voltage difference is such that "conventional" current flows from terminal 24, through resistor 28, through the base-to-emitter diode of transistor 12, through resistor 18, through the emitter-to-base diode of transistor 10, through resistor 34 to terminal 26. Since emitter-to-base current flows through transistors 10 and 12, collector current also flows through these transistors and a given output voltage appears across output terminals 36. Current does not flow through transistors 14 and 16. The reason is that the polarity of the input voltages $V_1$ and $V_2$ is such as to reverse bias the emitter-to-base diodes of transistors 14 and 16. −4 volts is applied to the base of transistor 16 and −2 volts is applied to the base of transistor 14 and the voltage difference is therefore in a sense to reverse bias the emitter-to-base diodes of both transistors.

Assume now that the input voltage $V_1$ is −4 volts and the input voltage $V_2$ is −2 volts. The difference in voltage between $V_1$ and $V_2$ is now of polarity to forward bias the emitter-to-base diodes of transistors 14 and 16 and to reverse bias the emitter-to-base diodes of transistors 10 and 12. Current now flows through transistors 14 and 16 and transistors 10 and 12 are cut off. The output voltage across terminals 36 is exactly the same as the output voltage at these terminals when $V_2$ is −4 volts and $V_1$ is −2 volts.

If the voltage $V_2$ should change to a value of −6 volts and the voltage $V_1$ to a value of −4 volts, the absolute magnitude of the difference in voltage is still 2 volts. Under these conditions, the same amount of current flows through the emitter-to-base diode of transistors 10 and 12 as when the voltages $V_2$ and $V_1$ are −4 and −2 volts, respectively. Accordingly, the voltage $V_3$ at terminals 36 is again the same as in the cases described above.

When $V_1$ is equal to $V_2$, there is no difference in voltage applied between the bases of any of the transistors. For example, the same voltage is applied to the base of transistor 14 as to the base of transistor 16. Accordingly, no current flows in the emitter-to-base diodes of these transistors, and since no base current flows, no collector current flows. Accordingly, the output voltage $V_3$ at terminals 36 is −25 volts. The same analysis holds for transistors 10 and 12. No emitter-to-base current flows in either of these transistors and the output voltage remains at −25 volts as already stated.

The purpose of resistors 18 and 20 is to provide a small amount of reverse bias on the transistors. This ensures that there is essentially no current flowing through the load resistor 22 when the two input voltages are identical. An additional advantage due to resistors 18 and 20 is that they provide a large amount of feedback. It is therefore not necessary to balance transistors, and any units in a production run may be used.

A practical circuit according to FIG. 1 may have the following values of circuit elements:

Resistors 28, 30, 32 and 34—10,000 ohms each
Resistors 18 and 20—2,700 ohms each
Resistor 22—5,600 ohms
PNP transistors 10 and 14—2 N 404
NPN transistors 12 and 16—2 N 440

Figure 2:
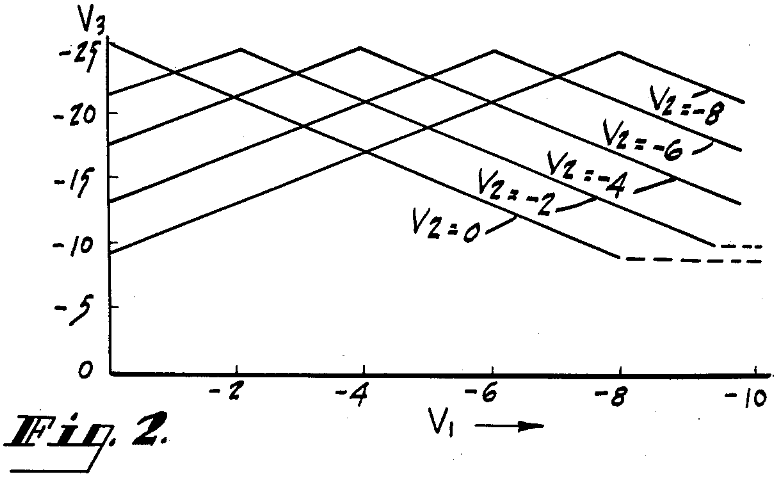
FIGS. 2 and 3 are graphs illustrating the performance of the circuit of FIG. 1.
Figure 3:
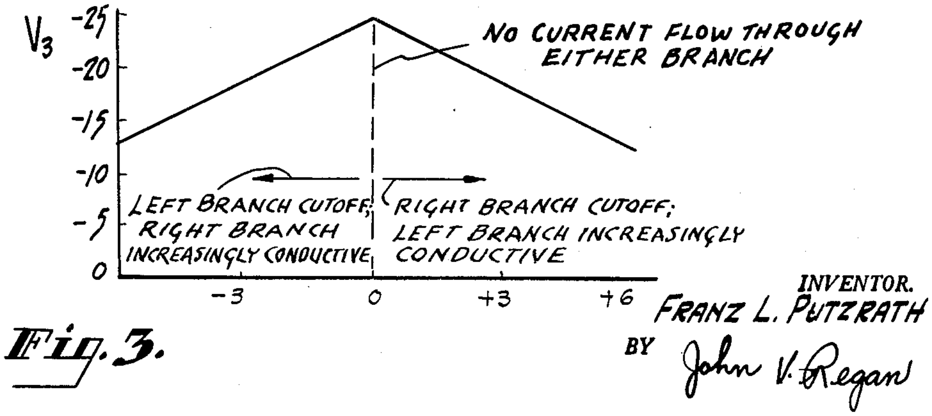

A circuit with the values of components above and the operating voltage shown produces outputs as shown in FIG. 2. It may be seen that the same output voltage is produced for a given difference in input voltages, regardless of the magnitudes of the input voltages or the sense of the difference. This is also shown in a somewhat different way in FIG. 3 which illustrates that the output voltage depends only on the difference in magnitudes of the input voltages and not on the individual magnitudes of the input voltages or the sense in the difference in the magnitudes.

What is claimed is:

1. In combination, two circuits connected in parallel, each comprising two transistors of opposite conductivity connected in series; a common load impedance connected in series with the two circuits through which an operating voltage for all of said transistors may be applied; means for applying an input voltage across the bases of the transistors in one circuit; and means for applying the same input voltage in an opposite sense across the bases of the transistors in the other circuit.

2. In combination, a first pair of transistors of opposite conductivity type connected in series and in a sense to conduct current in the same direction; a second pair of transistors of opposite conductivity type connected in series and in a sense to conduct current in the same direction, the two pairs of transistors being connected in parallel; a load resistor connected to both pairs of transistors through which an operating voltage for all of said transistors may be applied; and means for supplying a difference voltage across the bases of one pair of transistors and for supplying the same voltage in opposite polarity across the bases of the other pair of transistors.

3. In combination, two circuits connected in parallel, each comprising two transistors of opposite conductivity similarly connected in series, like electrode to like electrode; a common load resistor connected in series with the two parallel circuits for applying an operating voltage to said transistors; and means for applying an input voltage in one sense between the bases of the transistors in one circuit and in an opposite sense between the bases of the transistors in the other circuit.

4. In combination, two parallel circuits, each comprising two transistors of opposite conductivity connected in series emitter-to-emitter; a two terminal common load resistor for the two circuits connected at one terminal to the collectors of the two transistors of one conductivity type, whereby an operating voltage may be applied between the other terminal of said resistor and the collectors of the transistors of other conductivity type; means for applying one input signal to the base of a transistor of one conductivity type in one circuit and the base of a transistor of opposite conductivity type in the other circuit; and means for applying a second input signal to the bases of the other two transistors.

5. A difference amplifier comprising, in combination, a first pair of transistors of opposite conductivity type connected in series emitter-to-emitter; a second pair of transistors of opposite conductivity type connected in series emitter-to-emitter; a first common connection at the collectors of two of the transistors of like conductivity type; a second common connection at the collectors of the other two transistors; a load impedance connected at one terminal to said first common connection for supplying an operating voltage to the transistors; means for applying a first input signal between said second common connection and the bases of two transistors, one in each pair, of opposite conductivity type; and means for applying a second input signal between said second common connection and the bases of the other two transistors, one in each pair of opposite conductivity type.

6. A difference amplifier comprising, in combination, a first pair of transistors of opposite conductivity type connected in series emitter-to-emitter; a second pair of transistors of opposite conductivity type connected in series emitter-to-emitter; two resistors of like value, each connected in series with a pair of transistors between emitters; a first common connection at the collectors of two of the transistors of like conductivity type; a second common connection at the collectors of the other two transistors; a load impedance connected at one terminal to said first common connection for supplying an operating voltage to the transistors; means for applying a first input signal between said second common connection and the bases of two transistors, one in each pair, of opposite conductivity type; and means for applying a second input signal between said second common connection and the bases of the other two transistors, one in each pair, of opposite conductivity type.

No references cited.